(12) United States Patent
Mochida et al.

(10) Patent No.: US 6,415,663 B1
(45) Date of Patent: Jul. 9, 2002

(54) ANGULAR VELOCITY SENSOR

(75) Inventors: Yoichi Mochida, Fujisawa; Kazufumi Moriya, Yokohama, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/526,998

(22) Filed: Mar. 16, 2000

(30) Foreign Application Priority Data

Mar. 25, 1999 (JP) .......................................... 11-081537
Jun. 30, 1999 (JP) .......................................... 11-186529

(51) Int. Cl.$^7$ ............................. G01C 19/00; G01P 9/00
(52) U.S. Cl. .................................................. 73/504.12
(58) Field of Search ...................... 73/504.12, 504.02, 73/504.03, 504.04

(56) References Cited

U.S. PATENT DOCUMENTS 5,734,105 A    3/1998    Mizukoshi
6,134,961 A  * 10/2000   Touge et al. ............. 73/540.12

FOREIGN PATENT DOCUMENTS

WO         9815799        4/1998

OTHER PUBLICATIONS

K.Y. Park, et al., "Lateral Gyroscope Suspended By Two Gimbals Through High Aspect Ratio ICP Ectching", Jun. 1999, pp. 972–975.

W. Geiger, et al. "New Designs of Micromachined Vibrating Rate Gyroscopes with Decoupled Oscillation Modes", IEEE, 1997, pp. 1129–1132.

* cited by examiner

Primary Examiner—Richard A. Moller
(74) Attorney, Agent, or Firm—Ostrolenk, Faber, Gerb & Soffen, LLP

(57) ABSTRACT

An angular velocity sensor according to an embodiment of the present invention includes: a supporting substrate; a support-fixing portion disposed in the supporting substrate; a first supporting beam connected to the support-fixing portion; a first oscillator supported with the first supporting beam; a second supporting beam connected to the first oscillator; a second oscillator supported with the second supporting beam oscillating in the direction that a Coriolis force is generated; driving electrodes for driving the first oscillator and the second oscillator in a predetermined direction; and detecting electrodes for detecting the displacement of the second oscillator caused by the Coriolis force applied to the second oscillator, wherein the first supporting beam extends at least in the direction orthogonal to the oscillating direction of the first oscillator, both ends of the first supporting beam being connected to the first oscillator, and a longitudinally intermediate portion of the first supporting beam being joined to the support-fixing portion.

14 Claims, 7 Drawing Sheets

ANGULAR VELOCITY SENSOR

BACKGROUND OF THE INVENTION

1. Field of the Invention

The present invention relates to an angular velocity sensor for use in technologies, such as navigation systems for automobiles, compensation systems for camera shaking, and robot attitude controlling apparatuses.

2. Description of the Related Art

An angular velocity sensor is generally known which comprises a supporting substrate, a pair of support-fixing portions disposed in the supporting substrate, a first supporting beam connected to the support-fixing portion, a first oscillator supported with the first supporting beam, a second supporting beam connected to the first oscillator, a second oscillator supported with the second supporting beam oscillating in the direction that a Coriolis force is generated, driving means for driving these oscillators in a predetermined direction, and detecting means for detecting the displacement of the second oscillator due to the Coriolis force applied to the second oscillator.

Referring to FIGS. 9 and 10, a conventional angular velocity sensor 40 will now be described.

Numeral 31 represents a supporting substrate formed of Pyrex glass and a recess portion 31a is disposed in the central portion thereof.

Numeral 32 denotes a frame-shaped supporting body joined to a peripheral portion of the supporting substrate 31 by anodic bonding and the frame-shaped supporting body 32 is formed of silicon in a rectangular shape. In the frame-shaped supporting body 32, from four portions inside the crosspieces thereof disposed separated in the Y-axis direction from each other, first supporting beams 33a, 33b, 33c, and 33d (referred to generically below as first supporting beams 33) extend respectively in the y-axis direction. In the frame-shaped supporting body 32, the four portions fixed to the first supporting beams 33 are designated as support-fixing portions 32a.

End portions of the first supporting beams 33 are joined to outsides of the crosspieces of an oscillator 34, which is disposed in the inner periphery of the frame-shaped supporting body 32. The first supporting beams 33 support the oscillator 34 and allow it to oscillate in the x-axis direction. The oscillator 34 is roughly rectangularly frame-shaped and outsides of crosspieces thereof disposed separated in the y-axis direction from each other are joined to four portions of the first supporting beams 33. In the oscillator 34, from the four portions inside the crosspieces thereof disposed separated in the X-axis direction from each other, second supporting beams 35a, 35b, 35c, and 35d (referred to generically below as second supporting beams 35) extend respectively in the x-direction, and end portions thereof are respectively joined to the outside surfaces of a second oscillator, a load oscillator 36, which will be described later. In addition, the first supporting beams 33 and the second supporting beams 35 have an orthogonal relationship and the first supporting beams 33 extend in the Y-axis direction while the second supporting beams 35 extend in the X-axis direction.

The load oscillator 36, which is formed in a roughly rectangular plane, is disposed in the inner periphery of the oscillator 34 and is supported by the second supporting beams 35 which allow it to oscillate in the Y-axis direction.

Numerals 37, 37 represent driving portions serving as driving means disposed in the oscillator 34 and the frame-shaped supporting body 32, and separated in the X-direction from each other. The driving portions 37, 37 are formed of driving electrodes 37a and 37b respectively disposed in outer surfaces of crosspieces of the oscillator 34 separated in the X-axis direction and driving electrodes 37c and 37d respectively disposed in inner surfaces of the frame-shaped supporting body 32, opposing the driving electrodes 37a and 37b.

Numerals 38, 38 represent detecting portions serving as detecting means disposed in the oscillator 34 and the load oscillator 36, separated in the Y-direction from each other. The detecting portions 38, 38 are formed of detecting electrodes 38a and 38b respectively disposed in inner surfaces of crosspieces of the oscillator 34 separated in the Y-axis direction and detecting electrodes 38c and 38d respectively disposed in outer surfaces of the load oscillator 36, opposing the detecting electrodes 38a and 38b.

In addition, the oscillator 34, the load oscillator 36, the first supporting beams 33, and the second supporting beams 35 are integrally formed by working the same silicon base plate as the frame-shaped supporting body 32.

The conventional angular velocity sensor 40 is formed as described above and the operation thereof will now be described.

The load oscillator 36 and the oscillator 34 oscillate in the X-axis direction by electrostatic forces generated by applying respective ac voltages, which are 180° out of phase with each other and on which respective dc voltages are superimposed, to the driving electrodes 37a and 37c and the driving electrodes 37b and 37d. At this time, the oscillating of the load oscillator 36 in the X-axis direction is possible by the deflection of the first supporting beams 33.

During the oscillation of the load oscillator 36 in such manner, when the angular velocity sensor 40 is rotated by application of an angular velocity "Ω" about the Z-axis passing through the center of the load oscillator 36, a Coriolis force is generated in the Y-axis direction. Therefore, the load oscillator 36 oscillates also in the Y-axis direction. At this time, the oscillating of the load oscillator 36 in the Y-axis direction is possible by deflection of the second supporting beams 35.

When the load oscillator 36 oscillates in the Y-axis direction, the electrostatic capacity between the detecting electrodes 38a and 38c and the electrostatic capacity between the detecting electrodes 38b and 38d increase and decrease. Accordingly, these varying electrostatic capacities are converted to voltages and differentially amplified, so that a value of the rotational angular velocity "Ω" can be obtained.

However, since in the conventional angular velocity sensor 40, the supporting substrate 31 formed of Pyrex glass and the frame-shaped supporting body 32 formed of silicon are of a single-piece structure bonded together by anodic bonding, when the ambient temperature is changed, a tensile stress or a compressive stress is generated in the bonded portion due to the difference between respective thermal expansion coefficients.

When the thermal expansion coefficient of the supporting substrate 31 is larger than that of the frame-shaped supporting body 32, for example, strain is generated so that respective joining portions of the frame-shaped supporting body 32 to the first supporting beams 33 for driving are spread in the outside directions as shown by the arrows "c". This strain causes tensile forces to be applied in the outside directions in the first supporting beams 33 so as to increase the resonance frequency of driving. In this case, since the resonance frequency of detecting is not changed, the difference between the resonance frequencies of driving and detecting is increased, resulting in reduced detecting sensitivity.

This problem has a large effect especially on an angular velocity sensor designed to be highly sensitive by reducing the difference between the resonance frequencies of driving and detecting. Therefore, the conventional angular velocity sensor 40 has to be designed to increase the difference between the resonance frequencies of driving and detecting in advance for preventing reduction in detecting sensitivity due to the increased difference between the resonance frequencies of driving and detecting. Consequently, it has become a problem that angular velocity sensors having high sensitivity cannot be manufactured.

SUMMARY OF THE INVENTION

Accordingly, it is an object of the present invention to provide an angular velocity sensor having increased detecting sensitivity by reducing the difference between the resonance frequencies of driving and detecting due to the effect of different thermal expansion coefficients of the supporting substrate and the sensor element substrate.

An angular velocity sensor according to an embodiment of the present invention comprises: a supporting substrate; a support-fixing portion disposed in the supporting substrate; a first supporting beam connected to the support-fixing portion; a first oscillator supported with the first supporting beam; a second supporting beam connected to the first oscillator; a second oscillator supported with the second supporting beam oscillating in the direction that a Coriolis force is generated; driving means or elements for driving the first oscillator and the second oscillator in a predetermined direction; and detecting means or elements for detecting the displacement of the second oscillator caused by the Coriolis force applied to the second oscillator, wherein the first supporting beam extends at least in the direction orthogonal to the oscillating direction of the first oscillator, both ends of the first supporting beam being connected to the first oscillator, and a longitudinally intermediate portion of the first supporting beam being joined to the support-fixing portion.

According to one aspect of the invention, a sensor element comprising a support-fixing portion and movable portions such as a first oscillator is formed of a different material from that of a supporting substrate. For example, the supporting substrate is formed of Pyrex glass while the sensor element is formed of a silicon base plate. The movable portions are supported by, for example, a pair of spaced support-fixing portions via first supporting beams. Since the pair of support-fixing portions are fixed to the supporting substrate at an interval by, for example, anodic bonding, etc., when temperature is changed, the supporting substrate expands and contracts due to thermal expansion of the material while the sensor element also expands and contracts. However, when the coefficient of thermal expansion differs from the supporting substrate to the sensor element, the sensor element is subjected to the strain by the difference between coefficients of thermal expansion. Since the sensor element is fixed to the supporting substrate via the pair of support-fixing portions, the pair of support-fixing portions are directly subjected to the elastic strain (displacement) due to the difference between coefficients of thermal expansion.

When the center of the strain is in the center of the sensor element (supporting substrate), the strain expands or contracts radially and concentrically from the center thereof. Therefore, this expanding or contracting strain increases in proportion to the spacing between the pair of support-fixing portions.

The lines of action of the strain range within the width of the joining portions of the pair of support-fixing portions to the first supporting beams. When the width of the joining portions of the pair of support-fixing portions is large, a component of the strain is also generated in the longitudinal (extending) direction of the first supporting beams. When the joining portions are formed in a small width so that the acting range of the strain is reduced, i.e., lines of action of the strain converge at the line connecting the centers of the pair of support-fixing portions, the component of the strain in the longitudinal direction of the first supporting beams can be reduced.

When such the strain is acting in the direction of the line connecting the centers of the pair of support-fixing portions, i.e., the same as the driving direction, both sides of the longitudinally intermediate portion of the first supporting beam are equally deflected due to the strain because both sides of the support-fixing portion of the first supporting beam are symmetrical, so that the pair of first supporting beams are deformed or deflected in a "<" shape or an inverted "<" shape. Thereby the strain is absorbed by the deformation or the deflection so as not to affect the movable parts such as the first oscillator. Therefore, the stress due to the strain is scarcely generated in the extending direction of the first supporting beams.

Since the stress acting in the extending direction is a principal reason for variations in the resonance frequency in the driving direction, in this structure, the driving frequency is not affected by the thermal strain. Likewise, the resonance frequency of the second supporting beam in the detecting direction is not changed by the thermal strain because the second supporting beam is not directly joined to the substrate. Consequently, the difference between resonance frequencies in driving and detecting directions is not changed by variations in temperatures thereby preventing variations in detecting sensitivity. Accordingly, it is possible to provide an angular velocity sensor having a high sensitivity by making the mechanical resonance frequencies for driving and detection close to each other.

In addition, shapes of the pair of support-fixing portions and the first supporting beams are formed as described above, so that the strain due to the dispersion during manufacturing in addition to the strain due to variations in temperatures is absorbed by deformation or deflection of the first supporting beams so as to maintain the difference between mechanical resonance frequencies in driving and detecting to be constant. As a result, variations in detecting sensitivity is prevented, thereby stabilizing the operation characteristics.

According to another embodiment of the invention, the support-fixing portions are disposed in two positions outside the first oscillator separated from each other in the oscillating direction of the first oscillator, a width of a joining portion of each of the support-fixing portions to the first supporting beam being formed to be less than that of a root portion of the support-fixing portion.

According to this embodiment, the joining portion of each of two support-fixing portions supporting longitudinally intermediate portion of the first supporting beam is formed to be small in width. That is, the joining portion extending from the root portion of the support-fixing portion is formed to be tapered or the joining portion is formed in a short beam-shape, so that the thermal stress applied to the first supporting beams from the pair of support-fixing portions is directed to a straight line orthogonal to the longitudinal direction of the first supporting beam, thereby enabling focusing of the effect by the thermal stress from the pair of support-fixing portions on a straight line to reduce it all the more. As a result, it is possible to suppress the fluctuation of output sensitivity over an wide temperature range.

When the end portion of the support-fixing portion connected to the first supporting beam is large in width, for example, the strain due to the stress is applied on the overall surface of the support-fixing portion, so that at two joining positions between this support-fixing portion and the first supporting beam strain is generated due to the tensile stress or the compressive stress toward the outside or inside of the first supporting beam. In contrast, when the end portion of the support-fixing portion is small in width, the strain due to the stress is focused on a straight line connecting end portions of the opposing pair of the support-fixing portions thereby being absorbed by uniform deflection of the pair of the first supporting beams.

According to still another embodiment, the first oscillator is formed of a rectangular frame body, the second oscillator being rectangular and oscillating within the first oscillator, and wherein the second supporting beam extends in the same direction as the oscillating direction of the first oscillator, both ends of the second supporting beam being connected to the second oscillator, and a longitudinally intermediate portion of the second supporting beam being joined to the first oscillator.

According to this embodiment, both ends of the first supporting beam are connected to the first oscillator formed in a frame-body shape. The strain generated in the pair of support-fixing portions is absorbed with the first supporting beams so as not to affect the oscillation of the second oscillator. Therefore, the second oscillator oscillates efficiently in the same direction as that of the first oscillator without the effect of the strain while oscillates in the direction that a Coriolis force is generated. That is, the driving direction of oscillators and the detecting direction of a Coriolis force are geometrically well-balanced. This further improve the detection sensitivity.

According to still another embodiment, the first supporting beam is formed of plural arm portions extending in the direction orthogonal to the oscillating direction of the first oscillator and folded portions for connecting each arm portion together in a folded state extending in the same direction as the oscillating direction of the first oscillator.

According to such a configuration, when the first oscillator oscillates owing to the driving means, plural arm portions connected together in a folded state expand and contract. Therefore, the first oscillator oscillates easily in the oscillating direction enabling the amplitude to be increased. In addition, the resonance frequency of the first oscillator can be maintained to be stable regardless of the amplitude of the first oscillator, enabling the first oscillator to oscillate at the large amplitude so as to improve the detecting sensitivity of angular velocity.

According to an aspect of this embodiment, lengths of the folded portions are less than those of the arm portions.

Thereby, the first oscillator moves easily in the oscillating direction while can be formed to be difficult to oscillate in the direction orthogonal to the oscillating direction. Consequently, the first oscillator can oscillate only in the oscillating direction restricting the oscillation in the direction orthogonal to the oscillating direction.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF PREFERRED EMBODIMENTS

Hereinafter, the preferred embodiments of the present invention are explained in detail with reference to the drawings.

Figure 1:
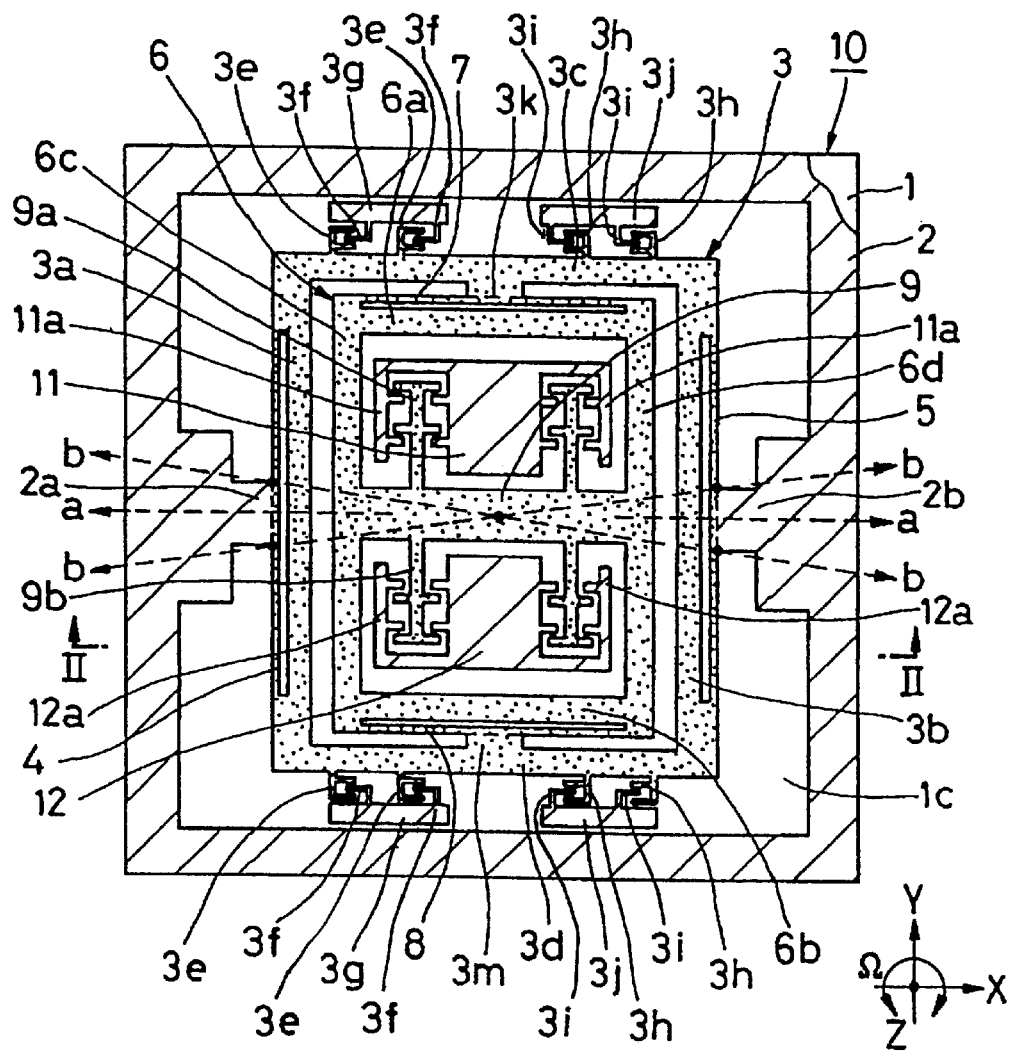
FIG. 1 is a plan view showing an angular velocity sensor according to a first embodiment of the present invention.
Figure 2:
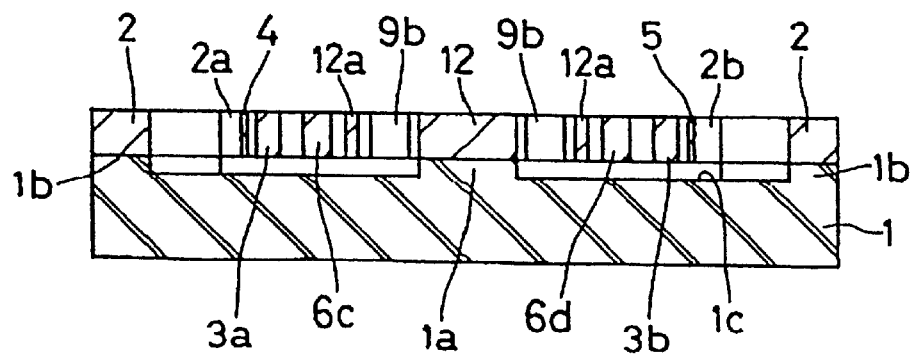
FIG. 2 is a sectional view viewed in the direction of arrows II—II in FIG. 1.

FIGS. 1 and 2 show an angular velocity sensor 10 according to a first embodiment of the present invention. Numeral 1 denotes a rectangular supporting substrate formed by working a Pyrex glass base plate. On the top surface of the supporting substrate 1 is disposed a recess portion 1c for providing a free oscillating space to movable portions of a first oscillator (an outside oscillator) and a second oscillator (an inside oscillator), and so forth, which will be described later. The support substrate further includes vertically protruding portions 1a, 1a disposed within the surface, and a peripheral, vertically protruding frame portion 1b surrounding the recess portion 1c.

The protruding portions 1a are disposed separated in the Y-axis direction from each other within the frame portion 1b. Fixed detecting electrodes 11 and 12, which will be described later, are formed on the portions 1a.

On the frame portion 1b is formed a rectangular supporting frame body 2, which is formed by working a silicon base plate. On the inner surfaces of crosspieces of the supporting frame body 2, separated in the X-axis direction from each other, inwardly protruding support-fixing portions 2a and 2b are respectively formed at longitudinally intermediate portions of these crosspieces.

Numeral 3 denotes a rectangular frame-shaped first oscillator. On the outsides of crosspieces 3a and 3b of the first oscillator 3 separated in the X-axis direction from each other, first supporting beams 4 and 5 are respectively disposed. The first supporting beams 4 and 5 extend in the Y-axis direction in parallel with the crosspieces 3a and 3b, respectively. The longitudinally intermediate portions (in the Y-axis direction) of the first supporting beams 4 and 5 are respectively connected to head portions of the support-fixing portions 2a and 2b while both ends of the first supporting beams 4 and 5 are respectively connected to end portions of the crosspieces 3a and 3b.

On outer surfaces of crosspieces 3c and 3d of the first oscillator 3 in the Y-axis direction, F-shaped comb-teeth electrodes 3e and 3h are formed. In these comb-teeth electrodes 3e and 3h, the comb-teeth sides thereof oppose each other. Within the recess portion 1c are formed fixed driving electrodes 3g and 3j having comb-teeth electrodes 3f and 3i, respectively, meshing with the comb-teeth electrodes 3e and 3h via a clearance. The electrodes 3e and 3f, and the electrodes 3h and 3j, respectively, form pairs of electrostatic driving electrodes which serve as driving means. When the first oscillator 3 is driven, voltages having opposite phases with each other are applied to the fixed driving electrodes 3g and 3j, respectively.

Numeral 6 denotes a rectangular frame-shaped second oscillator. The second oscillator 6 is supported inside the first oscillator 3 movably in the Y-axis direction. On the outsides of crosspieces 6a and 6b of the second oscillator 6, separated in the Y-axis direction from each other, second supporting beams 7 and 8 are respectively disposed. The second supporting beams 7 and 8 extend in the X-axis direction in parallel with the crosspieces 6a and 6b, respectively. Furthermore, on inner surfaces of longitudinally intermediate portions (in the X-axis direction) of crosspieces 3c and 3d of the first oscillator 3, separated in the Y-axis direction from each other, supporting portions 3k and 3m are respectively formed.

The longitudinally intermediate portions (in the X-axis direction) of the second supporting beams 7 and 8 are respectively connected to the supporting portions 3k and 3m of the crosspieces 3c and 3d. Both ends of the second supporting beams 7 and 8 are respectively connected to end portions of the crosspieces 6a and 6b.

On inner surfaces of longitudinally intermediate portions (in the Y-axis direction) of crosspieces 6c and 6d of the second oscillator 6, separated in the X-axis direction from each other, both end portions of a rectangular load oscillator 9 for adding mass to the second oscillator 6 are respectively connected. On one side of the load oscillator 9, two ladder-shaped, comb-teeth electrodes 9a are formed while on the other side thereof, two ladder-shaped, comb-teeth electrodes 9b are formed.

Numerals 11 and 12 denote fixed detecting electrodes, which are respectively disposed on both sides of the load oscillator 9 and respectively formed on each vertically protruding portion 1a in the recess portion 1c. The fixed detecting electrodes 11 and 12 have comb-teeth electrodes 11a and 12a, respectively, meshing with the comb-teeth electrodes 9a and 9b via a clearance.

In addition, movable parts (stippled portions), such as the first oscillator 3 and the second oscillator 6, and fixed parts (hatched portions), such as the supporting frame body 2, form a sensor element and are integrally formed by working the same silicon base plate. The movable parts are supported with a pair of the support-fixing portions 2a and 2b via a pair of the first supporting beams 4 and 5 so that oscillation is possible.

As described above, a pair of the support-fixing portions 2a and 2b formed by working a silicon base plate are joined on the supporting substrate 1 formed of a Pyrex glass base plate opposing each other at a predetermined spacing. When the thermal expansion coefficient of the Pyrex glass base plate is larger than that of the silicon base plate, the pair of the support-fixing portions 2a and 2b are subjected to tensile stress in the arrow "a" direction. Due to this tensile stress, the connecting portions in the longitudinally intermediate portions of the first supporting beams 4 and 5 are also subjected to tensile stress in the same direction. However, the stress is absorbed by deformation or deflection of the first supporting beams 4 and 5, so that the tensile stress is not applied to the first supporting beams. Therefore, tension in the first supporting beams 4 and 5 and the second supporting beams 7 and 8 is not changed, so that variations in mechanical resonance frequencies due to the tensile stress in the first supporting beams 4 and 5 and the second supporting beams 7 and 8 do not arise. Accordingly, the difference in the frequencies of driving and detecting is also not changed. Accordingly, a design optimizing the difference in resonance frequencies between driving and detecting is possible, resulting in improved sensing sensitivity.

Operation of the angular velocity sensor 10 will now be described.

First, between electrodes 3e and 3f and between electrodes 3h and 3i, respective ac voltages which are 180° out of phase with each other and on which respective dc voltages are superimposed, are applied. Then, the load oscillator 9 (including the first oscillator 3, and the second oscillator 6, etc.) oscillates in the X-axis direction owing to deflection of the pair of first supporting beams 4 and 5. During the inertial state of the load oscillator 9 by oscillation in this manner, when the load oscillator 9 is rotated by application of the angular velocity "Ω" about the Z-axis passing through the center of the load oscillator 9, the load oscillator 9 (including the second oscillator 6) oscillates also in the Y-axis direction owing to a Coriolis force. The oscillation in the Y-axis direction is possible by deflection of the pair of second supporting beams 7 and 8.

Then, one of the electrostatic capacity between the comb-teeth electrodes 9a and 11a and the electrostatic capacity between the comb-teeth electrodes 9b and 12a increases while the other thereof decreases. Accordingly, these varying electrostatic capacities are converted to voltages and differentially amplified, so that a value of the rotational angular velocity can be obtained.

Figure 3:
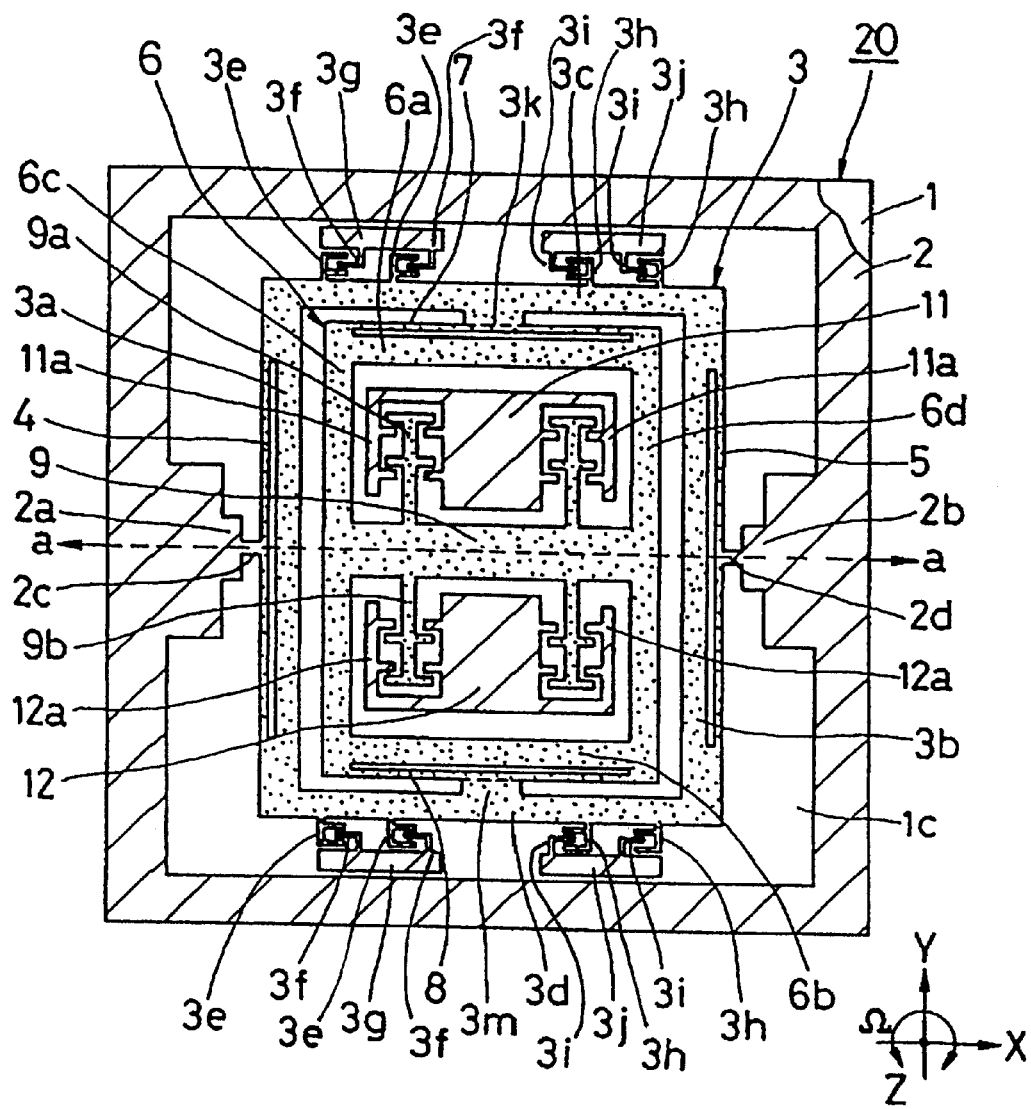
FIG. 3 is a plan view showing an angular velocity sensor according to a second embodiment.
Figure 4:
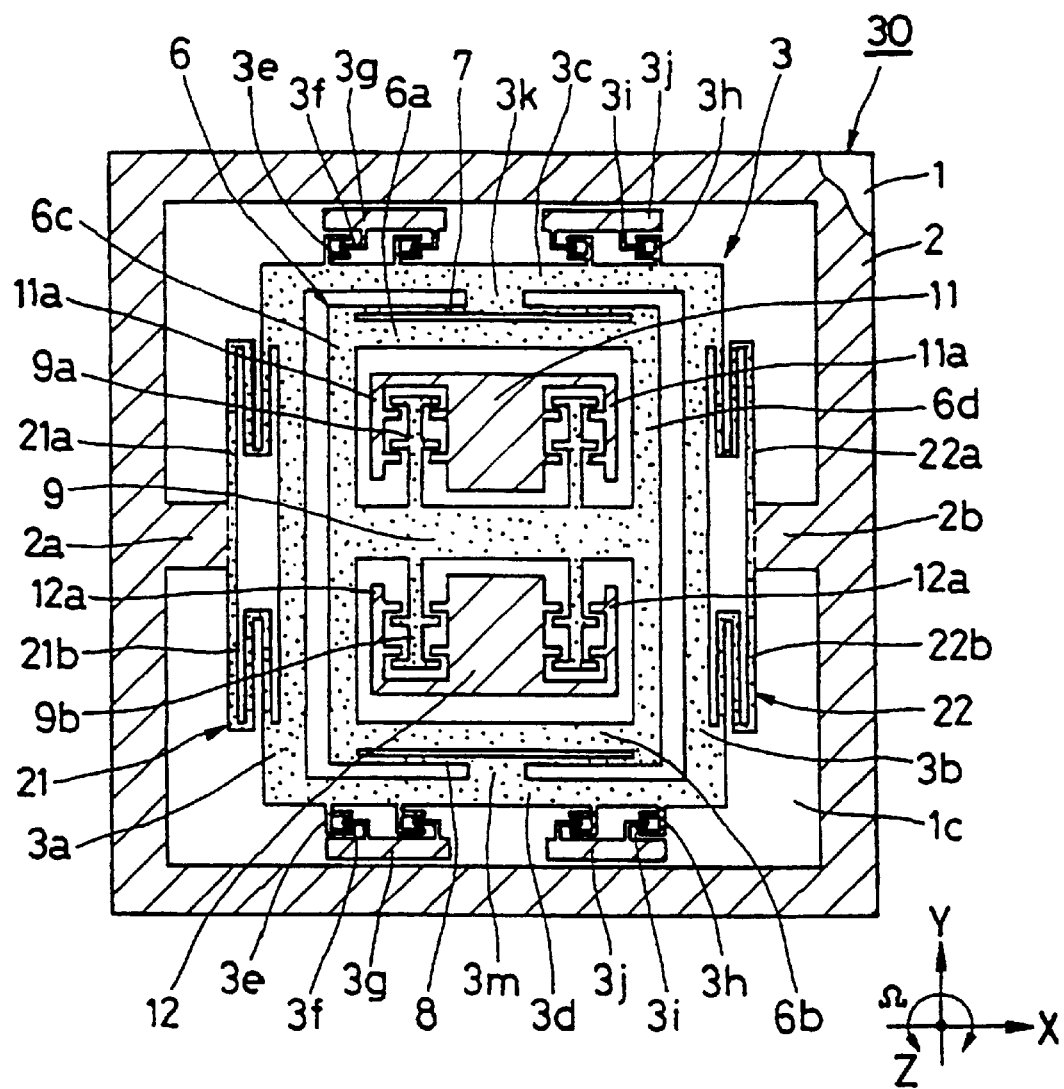
FIG. 4 is a plan view showing an angular velocity sensor according to a third embodiment.

Next, referring to FIG. 3, an angular velocity sensor 20 according to a second embodiment will be described. In this embodiment, connecting portions of the pair of first support-fixing portions 2a and 2b to the first supporting beams 4 and 5 of the angular velocity sensor 10 shown in FIG. 1 are narrowly formed as beams 2c and 2d. Since other parts are identical with those shown in FIG. 1, like reference characters designate like functional portions and detailed description thereof are omitted.

The connecting portions of the pair of first support-fixing portions 2a and 2b to the first supporting beams 4 and 5 of the angular velocity sensor 10 shown in FIG. 1 are wide and the tensile stress is practically applied thereto also in the direction shown by arrows "b", slightly deflected from the center line "a" of the pair of support-fixing portions 2a and 2b. The stress in the direction indicated by the arrows "b" gives rise to compressive stress components in the first supporting beams 4 and 5 so as to reduce mechanical resonance frequencies of the first supporting beams 4 and 5.

Accordingly, the driving frequency is changed so that the difference between the driving frequency and the detecting frequency differs from the initial set value, resulting in reduction of detecting sensitivity. Therefore, end portions (connecting portions) of the pair of support-fixing portions 2a and 2b are formed thinner shapes than root portions thereof by shaping connecting portions of the pair of support-fixing portions 2a and 2b to the first supporting beams 4 and 5 into the shapes of beams 2c and 2d and so forth, so that the thermal stress is focused on the center line "a" of the pair of support-fixing portions 2a and 2b, enabling the effect of the thermal stress to be further reduced.

Next, referring to FIGS. 4 to 8, an angular velocity sensor 30 according to a third embodiment will be described. In this embodiment, the first supporting beams 4 and 5 of the angular velocity sensor 10 shown in FIG. 1 are formed into folded shapes as first supporting beams 21 and 22 shown in FIG. 4. Since other parts are identical with those shown in FIG. 1, like reference characters designate like functional portions and detailed description thereof are omitted.

Numerals 21 and 22 denote first supporting beams for supporting the first oscillator 3 allowing it to oscillate in the Y-axis direction. The first supporting beams 21 and 22 are disposed in the outsides of crosspieces 3a and 3b of the first oscillator 3, which are separated in the X-axis direction. The first supporting beam 21 includes supporting beam portions 21a and 21b, which are roughly symmetrical about the support-fixing portion 2a, and a longitudinal (in the Y-axis direction) intermediate portion thereof, which is connected to the support-fixing portion 2a.

Figure 5:
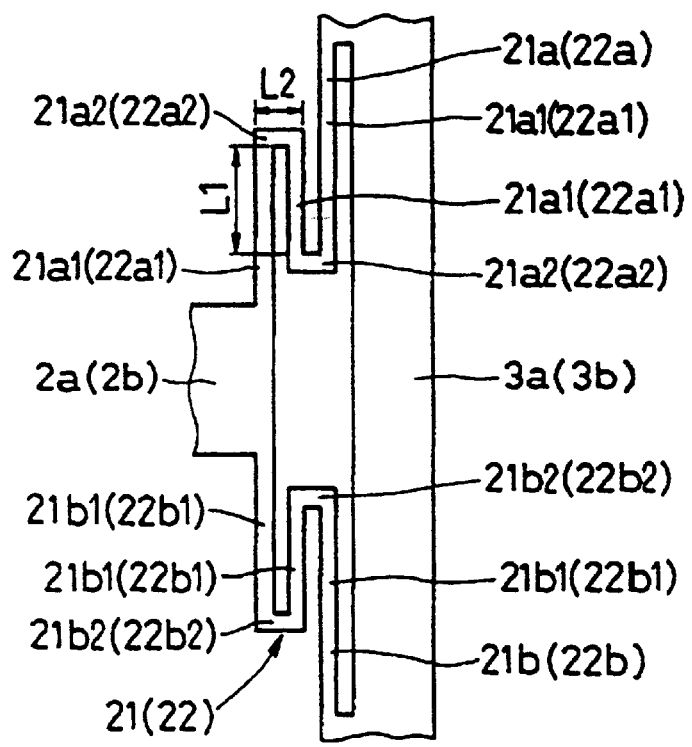
FIG. 5 is an expanded plan view of an essential part showing an enlarged first supporting beam according to the third embodiment.

As shown in FIG. 5, the supporting beam portion 21a is formed of three arm portions 21a1 extending in the Y-axis direction in parallel to the crosspiece 3a and two folded portions 21a2 extending in the X-axis direction for connecting between arm portions 21a1. The result is that supporting beam portion 21a on the whole assumes a roughly Z-shape.

Similarly, the supporting beam portion 21b is also formed of three arm portions 21b1 extending in the Y-axis direction and two folded portions 21b2 extending in the X-axis direction for connecting between arm portions 21b1, and, like the supporting beam portion 21a, the supporting beam portion 22 on the whole is formed in a roughly Z-shape. The base end portion of the supporting beam portions 21a and 21b is connected to the support-fixing portion 2a while end portions thereof are connected to both end portions of the crosspiece 3a of the first oscillator 3.

The first supporting beam 22 is formed of supporting beam portions 22a and 22b being roughly symmetrical about the support-fixing portion 2b while the longitudinal (in the Y-axis direction) intermediate portion thereof is connected to the support-fixing portion 2b. The supporting beam portion 22a is formed of three arm portions 22a1 extending in the Y-axis direction in parallel to the crosspiece 3b and two folded portions 22a2 extending in the X-axis direction for connecting between arm portions 22a1. The result is that the supporting beam portion 22 on the whole assumes a roughly Z-shape.

Similarly, the supporting beam portion 22b is also formed of three arm portions 22b1 extending in the Y-axis direction and two folded portions 22b2 extending in the X-axis direction for connecting between arm portions 22b1 and, like the supporting beam portion 22a, the supporting beam portion 22b on the whole is formed in a roughly Z-shape. The base end portion of the supporting beam portions 22a and 22b is connected to the support-fixing portion 2b while end portions thereof are connected to both end portions of the crosspiece 3b of the first oscillator 3.

The length "L1" of each of the arm portions 21a1, 21b1, 22a1, and 22b1 extending in the Y-axis direction is larger than the length "L2" of each of the folded portions 21a2, 21b2, 22a2, and 22b2 extending in the X-axis direction by factors of two to five, for example, as shown in FIG. 5.

The angular velocity sensor 30 formed in this manner according to the embodiment also has roughly the same advantages as those in the first embodiment described above.

However, in this embodiment, the first supporting beam 21 is formed of the arm portions 21a1 and 21b1 and the folded portions 21a2 and 21b2 in a folded shape while the first supporting beam 22 is formed of the arm portions 22a1 and 22b1 and the folded portions 22a2 and 22b2 in a folded shape. Therefore, when the first oscillator 3 (FIG. 4) oscillates by applying respective ac voltages, which are 180° out of phase with each other and on which respective dc voltages are superimposed, between electrodes 3e and 3f and between electrodes 3h and 3i, plural arm portions 21a1, 21b1, 22a1, and 22b1 connected together in a folded state repeat sequences of spreading and closing. Thereby the first oscillator 3 oscillates easily in the oscillating direction, enabling the amplitude thereof to be increased.

Figure 7:
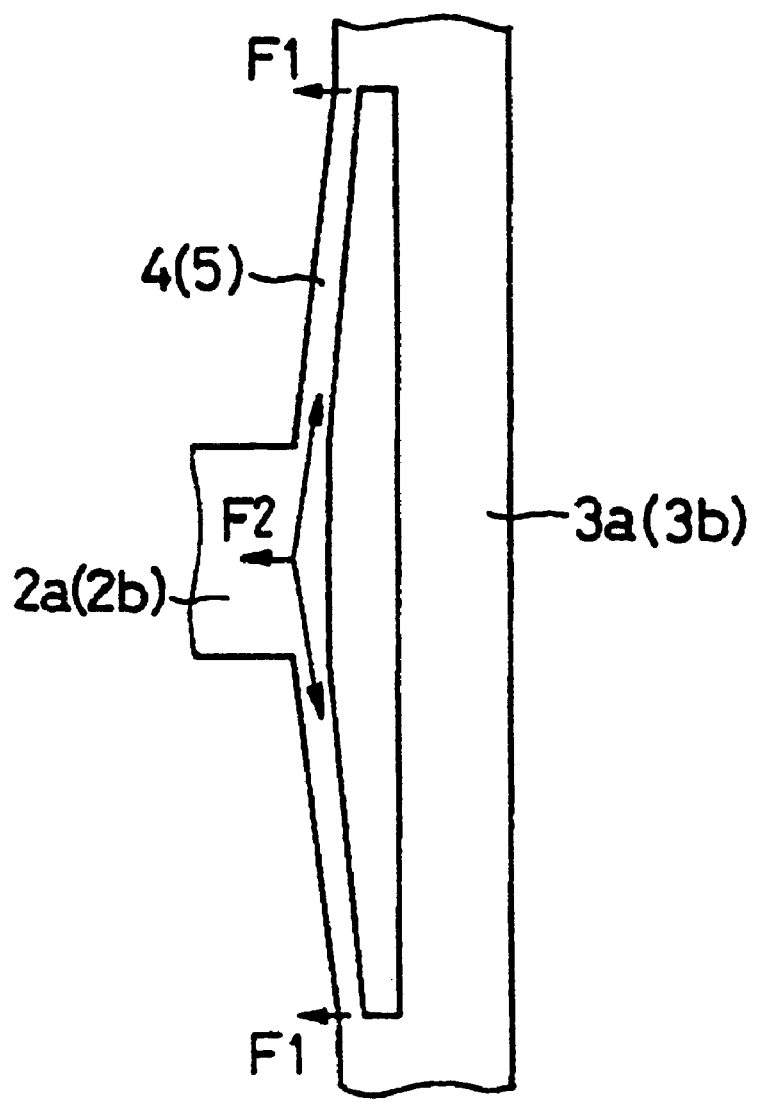
FIG. 7 is an expanded plan view of an essential part showing an enlarged first supporting beam according to a comparative example.

When the first oscillator 3 is supported with the first supporting beams 4 and 5 extending straight as in the first and second embodiments allowing the oscillator to oscillate, spring forces "F2" caused by the tensile stress are applied to the first supporting beams 4 and 5 in addition to spring forces "F1" owing to deflection of the first supporting beams 4 and 5 as shown by a comparative example in FIG. 7. The spring force "F2" owing to the tensile stress increases with increasing amplitude of the first oscillator 3. Consequently, when the amplitude of the first oscillator 3 is small, the first oscillator 3 oscillates at the resonance frequency "fa" having the maximum amplitude as the characteristic curve "A" shown by the solid line in FIG. 8, whereas when the amplitude of the first oscillator 3 is large, the first oscillator 3 oscillates at the resonance frequency "fb" higher than the resonance frequency "fa" having the maximum amplitude as the characteristic curve "B" shown by the dotted line in FIG. 8, so that the resonance frequency varies corresponding to the amplitude of the first oscillator 3.

On the other hand, the amplitude of oscillation of the second oscillator 6 by the Coriolis force increases when the resonance frequency of the second oscillator 6 is the same as that of the first oscillator 3, and when the amplitude of oscillation of the first oscillator 3 is large, the amplitude of oscillation by a Coriolis force increases. Therefore, since the resonance frequency of the second oscillator 6 is established to be roughly the same as the resonance frequency "fa" of the first oscillator 3, for example, when the first oscillator 3 oscillates at the resonance frequency "fb" different from the resonance frequency "fa", the amplitude of the second oscillator 6 decreases. Accordingly, even when the amplitude of the first oscillator 3 is increased to increase the amplitude of the second oscillator 6, the amplitude of the second oscillator 6 cannot be increased because the resonance frequency of the first oscillator 3 varies, so that detecting sensitivity cannot be improved.

Figure 6:
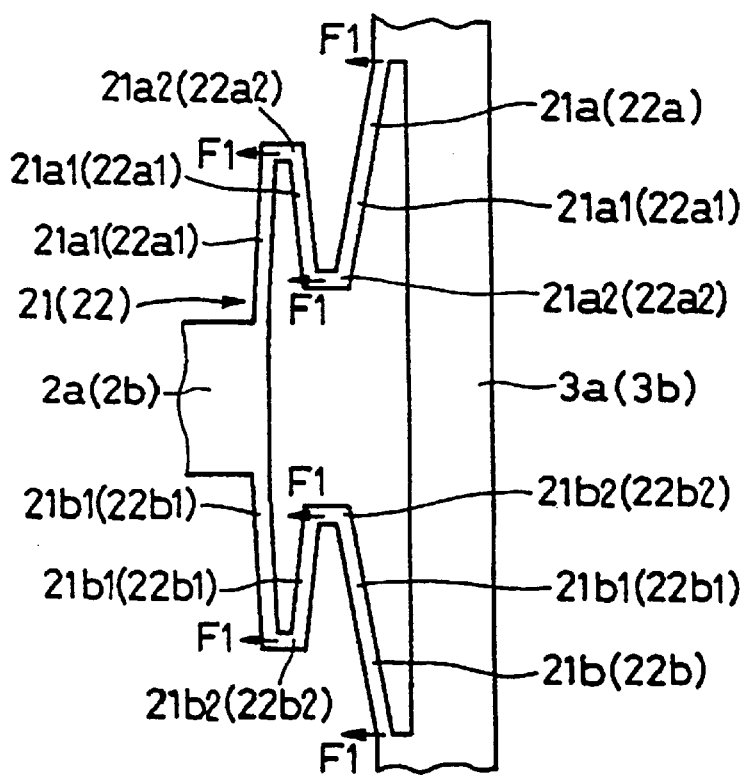
FIG. 6 is an expanded plan view of an essential part showing a first supporting beam when a first oscillator moves.

Whereas, in the third embodiment, since the first supporting beams 21 and 22 are formed in a folded shape, when the first oscillator 3 oscillates, plural arm portions 21a1, 21b1, 22a1, and 22b1 connected together in a folded state spread and close. Therefore, only a spring force "F1" caused by deflection of the first supporting beams 21 and 22 is applied to the first supporting beams 21 and 22 as shown in FIG. 6 while the spring force "F2" caused by the tensile stress as shown in FIG. 7 is not applied.

Figure 8:
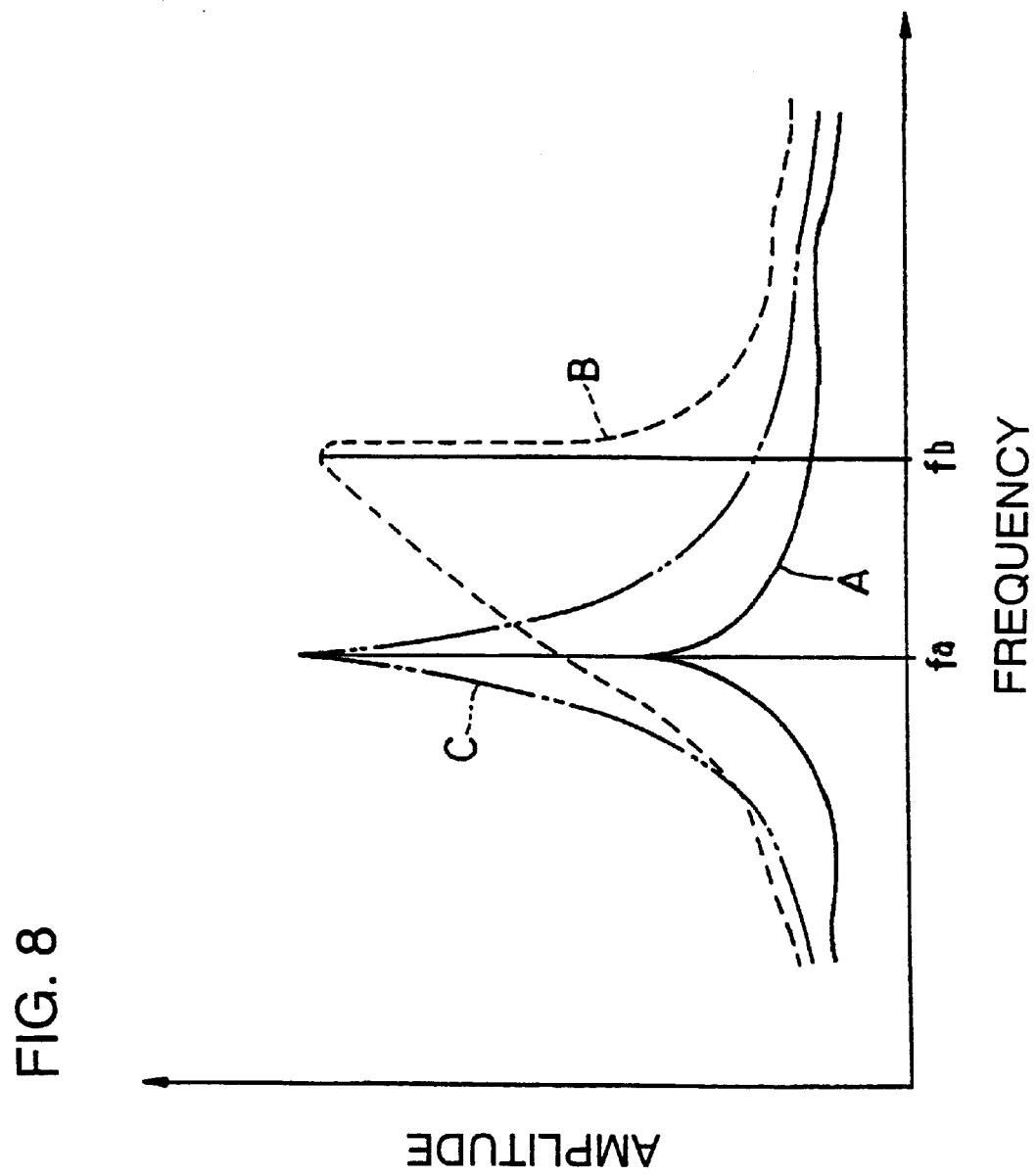
FIG. 8 is a characteristic graph showing a relationship between frequencies and amplitudes of the oscillating first oscillator.
Figure 9:
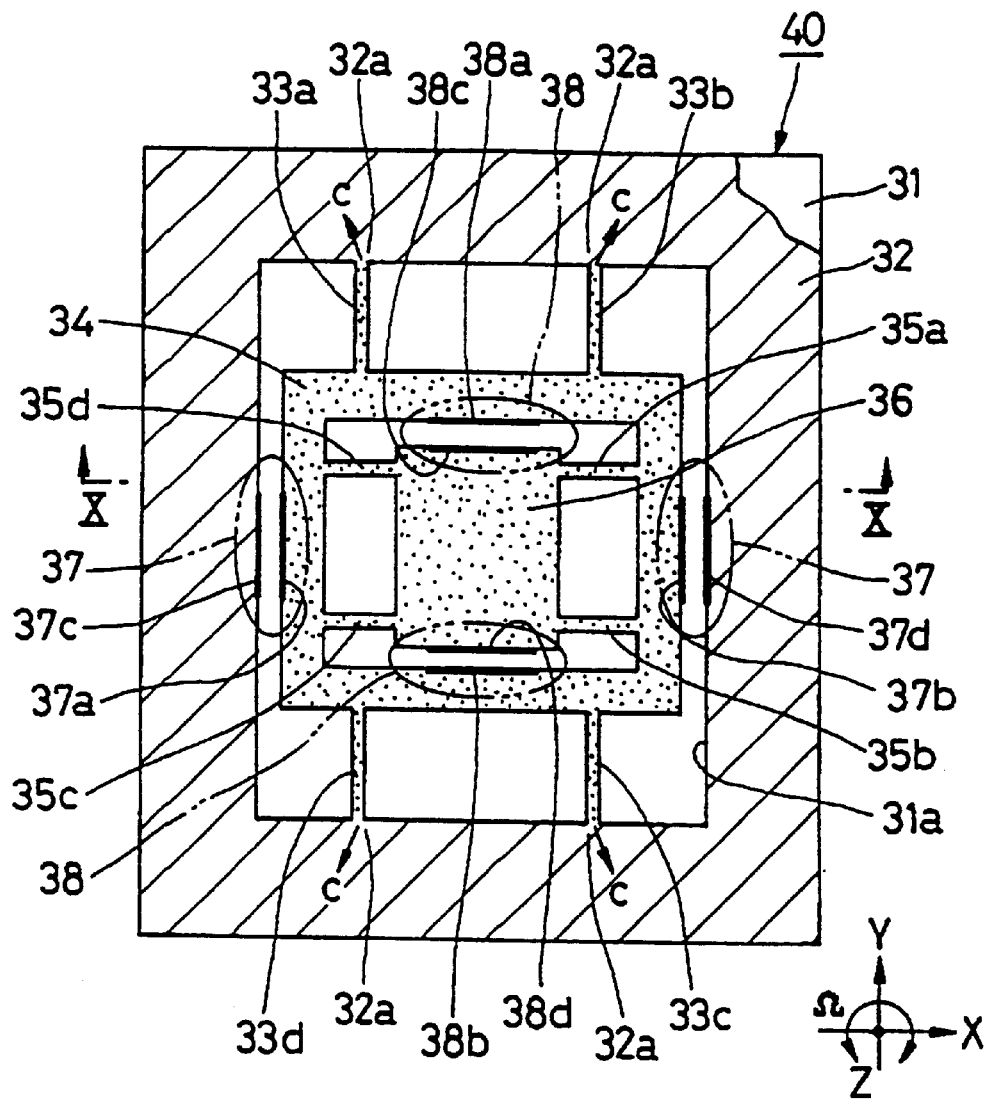
FIG. 9 is a plan view showing a conventional angular velocity sensor.
Figure 10:
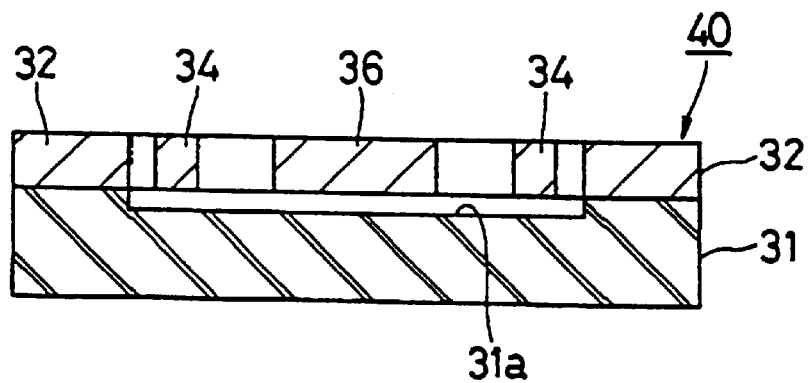
FIG. 10 is a sectional view viewed in the direction of arrows X—X in FIG. 9.

Accordingly, even when the amplitude of the first oscillator 3 is large, the first oscillator 3 oscillates at the resonance frequency "fa" having the maximum amplitude and can maintain the resonance frequency of a constant value regardless of the amplitude of the first oscillator 3, as indicated by the characteristic curve "C" shown by the phantom line in FIG. 8. Consequently, because the first oscillator 3 and the second oscillator 6 can oscillate at almost the same resonance frequency "fa" regardless of the amplitude of the first oscillator 3, the displacement of the second oscillator 6 caused by a Coriolis force can be increased by oscillation at the large amplitude of the first oscillator 3, thereby improving detecting sensitivity.

Furthermore, since the folded portions 21a2, 21b2, 22a2, and 22b2 of the first oscillator 3 extending in the oscillating direction are formed in lengths smaller than those of the arm portions 21a1, 21b1, 22a1, and 22b1, the displacement in the oscillating direction of the first oscillator 3 can be allowed while being restricted in the orthogonal direction to the oscillating one by the first supporting beams 21 and 22. Thereby, the first supporting beams 21 and 22 can support the first oscillator 3 allowing it to move only in the oscillating direction.

In addition, in the third embodiment, the longitudinally intermediate portions of the first supporting beams 21 and 22 are connected to the support-fixing portions 2a and 2b, which may be the same as in the first embodiment; however, alternatively, they may be connected to the beams 2c and 2d shown in the second embodiment.

In the first to third embodiments, the supporting substrate 1 is formed of a Pyrex glass base plate; however, it may be formed of a silicon base plate with silicon oxide membrane formed thereon.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An angular velocity sensor in which a Coriolis force is generated, comprising:
   a supporting substrate;
   a support beam-fixing portion disposed in the supporting substrate;
   a first supporting beam connected to the support beam fixing portion;
   a first oscillator supported with the first supporting beam for oscillatory movement in a first direction, the first supporting beam having opposed ends and a longitudinally intermediate portion and extending at least in a direction orthogonal to the first direction, the opposed ends of the first supporting beam being connected to the first oscillator and the longitudinally intermediate portion of the first supporting beam being joined to the support beam-fixing portion;
   a second supporting beam connected to the first oscillator;
   a second oscillator supported by the second supporting beam for oscillatory displacement in a second direction, the second oscillator being displaced in said second direction in response to a Coriolis force being generated;
   driving means for oscillating the first oscillator in the first direction; and
   detecting means for detecting the displacement of the second oscillator when the Coriolis force is generated.

2. An angular velocity sensor in which a Coriolis force is generated, comprising:
   a supporting substrate;
   a support beam-fixing portion disposed in the supporting substrate;
   a first supporting beam connected to the support-fixing portion;
   a first oscillator supported with the first supporting beam for oscillatory movement in a first direction, the first supporting beam having opposed ends and a longitudinally intermediate portion and extending at least in a direction orthogonal to the first direction, the opposed ends of the first supporting beam being connected to the first oscillator, and the longitudinally intermediate portion of the first supporting beam being joined to the support beam-fixing portion;
   a second supporting beam connected to the first oscillator;
   a second oscillator supported by the second supporting beam for oscillatory displacement in a second direction, the second oscillator being displaced in said second direction in response to a Coriolis force being generated;
   driving elements for oscillating the first oscillator in the first direction; and
   detecting elements for detecting the displacement of the second oscillator when the Coriolis force is generated.

3. An angular velocity sensor according to claim 1 or claim 2, wherein the support beam-fixing portion includes a head portion connected to the longitudinally intermediate portion and a root portion connected to the supporting substrate, a width of the head portion being less than a width of the root portion.

4. An angular velocity sensor according to claim 1 or claim 2, wherein two support beam-fixing portions are provided, the two support beam-fixing portions being spaced from each other in the first direction and the first oscillator being supported between the two support-fixing portions.

5. An angular velocity sensor according to claim 4, wherein each support beam-fixing portion includes a head portion connected to the longitudinally intermediate portion and a root portion connected to the supporting substrate, a width of the head portion being less than a width of the root portion.

6. An angular velocity sensor according to claim 1 or claim 2, wherein the first oscillator is formed of a rectangular frame body, the second oscillator being rectangular and oscillating within the first oscillator, and wherein the second supporting beam has opposed ends and a longitudinally intermediate portions and extends in the same direction as the first direction of the first oscillator, the opposing ends of the second supporting beam being connected to the second oscillator, and the longitudinally intermediate portion of the second supporting beam being joined to the first oscillator.

7. An angular velocity sensor according to claim 1 or claim 2, wherein the first supporting beam is formed of plural arm portions extending in a direction orthogonal to the first direction of the first oscillator and folded portions for connecting each arm portion together in a folded state extending in the same direction as the first direction.

8. An angular velocity sensor according to claim 7, wherein the arm portions and the folded portions have respective lengths and the lengths of the folded portions are less than those of the arm portions.

9. An angular velocity sensor according to claim 1, wherein the driving means includes driving electrodes on the first oscillator and cooperating driving electrodes on the supporting substrate.

10. An angular velocity sensor according to claim 9, wherein at least one of the driving electrodes has a comb-like configuration.

11. An angular velocity sensor according to claim 10, wherein the detecting means includes detecting electrodes on the second oscillator and cooperating detecting electrodes on the substrate.

12. An angular velocity sensor according to claim 11, wherein at least one of the detecting electrodes has a comb-like configuration.

13. An angular velocity sensor according to claim 1 or claim 2, wherein the supporting substrate and the support beam-fixing portion are composed of different materials.

14. An angular velocity sensor according to claim 13, wherein the support substrate is comprised of glass and the support beam-fixed portion is comprised of silicon.

* * * * *